Patented Apr. 13, 1954

2,675,378

UNITED STATES PATENT OFFICE 2,675,378

CYCLIC PROCESS FOR PREPARING DIAZOALKANES

Frank S. Fawcett, Wilmington, Del., assignor to E. I. du Pont de Nemours and Company, Wilmington, Del., a corporation of Delaware No Drawing. Application July 22, 1952,
Serial No. 300,333

2 Claims. (Cl. 260—239)

This invention relates to the preparation of aliphatic diazo compounds and more particularly to a cyclic process for obtaining such products.

The aliphatic diazo compounds are an exceptional class of chemical intermediate characterized by versatility in their reactions. Thus, diazomethane is particularly useful in organic syntheses, for example, in the methylation of acidic organic compounds, the lengthening of carbon chains of carboxylic acids by the well-known Arndt-Eistert synthesis ("Organic Reactions," vol. I, p. 38, John Wiley & Sons, Inc. (1942)), and in a variety of useful reactions with carbonyl compounds and unsaturated organic derivatives. Diazomethane is also unique among the diazoalkanes because of the ease with which it is converted to high molecular weight polymethylenes.

In the laboratory diazomethane is readily obtained by the alkaline cleavage of N-nitroso-N-methylurethane or N - nitroso - N - methylurea. These procedures are not adaptable, however, to large scale operation because in each case a large fragment of the starting molecule is lost by degradation to products which are not suitable for re-use in the process.

It is an object of this invention to provide a novel process for the preparation of aliphatic diazo compounds. A further object is to provide a cyclic process for the preparation of aliphatic diazo compounds in which the starting materials are converted to the aliphatic diazo compound and to a product capable of re-use in the process. A still further object is to provide a process for the preparation of aliphatic diazo compounds which utilizes as the essential starting materials a dialkyl oxamide, primary aliphatic monoamine and a nitrosating agent, such as an oxide of nitrogen. Another object is to provide a cyclic process for obtaining diazomethane as substantially the only ultimate product. Other objects will appear hereinafter.

These objects are accomplished by the following invention of a process for preparing aliphatic diazo compounds which comprises reacting an N,N'-dialkyl-N,N'-dinitrosooxamide, of the type more fully described hereinafter, with an alkyl primary monoamine bearing hydrogen on the alpha carbon atom of the alkyl group, i. e., the carbon atom attached to amino nitrogen, and separating therefrom an aliphatic diazo compound and an N,N'-dialkyloxamide. The resulting N,N'-dialkyloxamide is nitrosated thereby reforming an N,N'-dialkyl-N,N'-dinitrosooxamide and the thus re-formed N,N'-dialkyl-N,N'-dinitrosooxamide is subjected to reaction with an alkyl primary monoamine as aforesaid.

In practice, an N,N'-dialkyloxamide in solution or as a slurry in a suitable solvent is nitrosated by treating it with oxides of nitrogen, conveniently generated by reacting 56% nitric acid with arsenious oxide, or by other suitable means for generating nitrogen oxides known to the art. The resulting N,N'-dialkyl-N,N'-dinitrosooxamide is then treated with an alkylmonoamine, preferably one whose alkyl group is the same as that attached to the nitrogen of the oxamide. The aliphatic diazo compound, if it boils lower than the solvent, continuously distills as it forms, and is collected in suitably refrigerated traps. If the aliphatic diazo compound boils above the solvent, then it can be isolated by extraction, by precipitation by drowning in a nonsolvent, by distillation, or by other means known to those skilled in the art. The N,N'-dialkyl-oxamide, which is formed along with the aliphatic diazo compound, can be recycled in the process by nitrosating it and repeating the treatment with alkylmonoamine. The present method thus accomplishes the conversion of an amine to the corresponding diazo compound by utilizing only low cost oxides of nitrogen and an amine. Thus, no valuable materials are lost as by-products, costs are reduced and overall economics of the process are outstanding in comparison with the processes of the art.

The examples that follow illustrate certain preferred embodiments of this invention but are not to be construed as limitations thereof.

Example I

A 100 cc. round bottomed reactor was equipped with two dropping funnels and a condenser arranged for distillation with delivery of the distillate below the surface of a cooled diethyl ether solution containing 6.08 grams (0.0498 equiv.) of benzoic acid. Ether was placed in one dropping funnel and 5.5 cc. (approximately 0.045 equiv.) of a 25% aqueous solution of methylamine in the other. A solution of 3.48 grams (0.02 mole, 0.04 equiv.) of N,N'-dimethyl-N,N'-dinitrosooxamide in 50 cc. of diethyl ether was placed in the reaction flask and slow distillation of ether was established by means of a warm water bath. As the ether distilled, it was replaced by addition from the dropping funnel. The amine was added dropwise during four minutes, causing an active reaction with evolution of diazomethane. The yellow diazomethane distilled with the ether and was collected in the benzoic acid solution, where it was immediately decolorized by conversion to methyl benzoate and nitrogen. As the amine was added, a white solid separated from the ether solution in the flask. Heating was continued with occasional swirling for an additional 10 minutes, during which time the yellow color of the distillate and reaction mixture disappeared. After a further 5 minute period (making a total of approximately 20 minutes), heating was discontinued. Titration showed that 0.0258 equivalent of benzoic acid had been consumed, corresponding to a 65% yield of two moles of diazomethane. Evaporation of the contents of the reaction flask to dryness yielded 1.89 g. (82%) of white solid which melted at 200–202° C. and which was identified as N,N'-dimethyloxamide by mixed melting point with an authentic sample.

The N,N'-dimethyloxamide obtained as above can be nitrosated and recycled in the process as described below.

Example II

The N,N'-dimethyloxamide produced in the process of Example I was suspended in glacial acetic acid and treated with nitrogen oxides generated from arsenic trioxide and 56% nitric acid at essentially room temperature. The N,N'-dimethyl-N,N'-dinitrosooxamide was purified by dissolving in chloroform and precipitating by adding petroleum ether and cooling. The purified nitroso derivative melted at 61–64° C. and was a bright yellow crystalline solid.

To a solution of 1.74 g. of the N,N'-dimethyl-N,N'-dinitrosooxamide thus obtained in 50 ml. of ether there was added 2.5 ml. of 25% aqueous methylamine. Gas evolution began immediately and the mixture was warmed with a water bath to aid distillation of diazomethane. The yellow distillate of diazomethane and ether was collected in Dry-Ice-cooled solution of 4.0 g. of benzoic acid and 40 ml. of ether. After a period of 25 minutes, during which time ether was added to replace that which distilled, the residual material was essentially colorless. Titration of the benzoic acid solution showed a 62% yield of 2 moles of diazomethane. The white solid remaining with the ether in the reaction flask when dried amounted to 1.12 g., essentially the theoretical quantity, of N,N'-dimethyloxamide, melting point 185–200° C.; after recrystallization from ethanol, melting point 210–213° C. The N,N'-dioxamide obtained as above can again be recycled in the process and thus re-utilized.

Example III

The procedure of Example II was repeated using 3.48 g. of the N,N'-dimethyl-N,N'-dinitrosooxamide and 3.8 ml. of 25% aqueous methylamine. Titration showed that a 56% yield of 2 moles of diazomethane was formed and 2.27 g. of slightly yellow N,N'-dimethyloxamide, melting point 190–198° C. were recovered from the reaction mixture. After recrystallization from ethanol the melting point of the N,N'-dimethyloxamide was raised to 206–209° C. This N,N'-dimethyloxamide can be nitrosated to N,N'-dimethyl-N,N'-dinitrosooxamide and thus used for preparation of the desired diazomethane.

Example IV

A reaction flask containing a clear yellow solution of 1.0 g. of N,N'-dimethyl-N,N'-dinitrosooxamide in 50 ml. of ether was fitted with a dropping funnel for the addition of ether, a gas inlet tube for the addition of anhydrous gaseous methylamine from a cylinder, and a delivery tube for delivering distillate into a receiver cooled with Dry-Ice and containing ether. Anhydrous methylamine gas was passed into the solution with the resulting formation of a white precipitate and the evolution of heat. As the addition was continued, boiling of the ether occurred and the yellow diazomethane codistilled with the ether into the receiver. The mixture was warmed on a water bath until the distillate was no longer colored. There was isolated from the residue 0.25 g. or 38% of a white solid, melting at 211.5 to 213.5° C. This was identified as N,N'-dimethyloxamide by mixed melting point with an authentic sample prepared from diethyl oxalate and aqueous methylamine. The presence of diazomethane in the distillate was shown by its characteristic yellow color, and by its immediate decolorization with benzoic acid. This N,N'-dimethyloxamide can be nitrosated and thus recycled into the process for preparation of diazomethane.

Example V

A clear solution of 2.6 g. of N,N'-di-n-hexyloxamide in 25 ml. of glacial acetic acid was treated with oxides of nitrogen generated from arsenic trioxide and 56% nitric acid. The initially colorless solution gradually turned yellow and finally dark green. Occasionally tests were made for completion of the reaction by diluting small samples and it was found that after two hours reaction time dilution with ice water produced a yellow precipitate of the nitroso derivative. The total aqueous mixture after such dilution was extracted with ether and the yellow ether solution washed with cold dilute sodium bicarbonate and then with cold water.

The addition of n-hexylamine to the ether solution resulted in the immediate formation of a precipitate accompanied by boiling of the ether. The mixture was filtered and washed on the filter with ether giving 0.2 g. of white solid, melting point 131–133° C., which was identified as N,N'-di-n-hexyloxamide, by mixed melting point with an authentic sample. The diazo-n-hexane in the filtrate was identified by its conversion to the n-hexyl ester of 3,5-dinitrobenzoic acid by reaction with 3,5-dinitrobenzoic acid (see Adamson and Kenner, J. Chem. Soc. 1935, p. 287). There was thus obtained 0.1 g. of the n-hexyl ester of 3,5-dinitrobenzoic acid, melting point 54–55° C. which was identified by mixed melting point with an authentic sample prepared from n-hexyl alcohol and 3,5-dinitrobenzoyl chloride.

The N,N'-di-n-hexyloxamide was prepared by the addition of diethyl oxalate to a solution of n-hexylamine in absolute ethanol. The white crystalline solid was isolated in approximately 75% yield and after recrystallization showed a melting point of 130° to 130.8° C.

*Anal.*—Calc'd for $C_{14}H_{28}N_2O_2$: N, 10.9. Found: N, 11.66.

The nitrosation reaction which leads to the formation of N,N'-dialkyl-N,N'-dinitrosooxamide is conducted at temperatures of from 0° to 30° C., depending upon the method used. Temperatures of 5° to 25° C. are generally employed because good yields of the desired dinitrosooxamide at good reaction rates are realized in this range. Because the nitrosation reaction is exothermic, once it is initiated, regulation is necessary either by cooling or by adding the nitrosating agent at such rate that the amount of heat of reaction evolved is just enough to maintain the temperature within the range selected for operation.

The amount of nitrosating agent used is at least one mole per amido hydrogen in the N,N'-dialkyloxamide.

Although in the examples the nitrosation has been effected with oxides of nitrogen formed by reaction of arsenious oxide with 56% nitric acid, this is only because of convenience. Oxides of nitrogen may be generated in other ways, for example, by the reaction of nitric acid on sodium nitrite. Alternatively, the bis-nitrosooxamide can be made by reacting the N,N'-dialkyloxamide with nitrous acid, nitrosyl chloride, or nitrosyl sulfuric acid. The nitrous acid can be made conveniently by reacting dilute hydrochloric acid with isoamyl nitrite or other ester of nitrous acid, sodium nitrite, and the like.

The nitrosation reaction is preferably carried out in the presence of inert materials which are solvents for the N,N'-dialkyloxamide. Suitable solvents are hydroxylated compounds as glacial acetic acid, water and alcohols, or ethers, hydrocarbons, halogenated hydrocarbons, and the like.

In the conversion of the N,N'-dialkyl-N,N'-dinitrosooxamide to the diazoalkane, there may be used any primary aliphatic monoamine in which the amino nitrogen is attached to a hydrogen-bearing aliphatic carbon atom. In the preferred practice an alkyl monoamine is used whose alkyl group is identical to those in the N,N'-dialkyl-N,N'-dinitrosooxamide.

The amount of amine used is such as to provide an equivalent per nitroso group in the N,N'-dialkyl-N,N'-dinitrosooxamide. Larger amounts, up to 2 or more equivalents per nitroso group in the oxamide, may be used but this generally has no practical advantage and tends to increase costs.

In practice, if the amine is gaseous, it can be bubbled into the solution of the nitrosooxamide at such a rate as to maintain the reaction temperature within the range selected for operation. On the other hand, if the amine is normally a liquid or solid, it is preferable to add it to the nitrosooxamide in the form of a solution in a solvent, which is desirably the same as the solvent in which the nitrosooxamide is dissolved. Water is a convenient solvent for use with lower molecular weight amines. The rate of addition is controlled so as to maintain the temperature of the reaction mixture within the range of 20° to 40° C. The particular temperature is generally controlled by the nature of the solvent in which the amination of the N,N'-dialkyl-N,N'-dinitrosooxamide is conducted. With diethyl ether, 30° to 40° C. is a convenient temperature, and whenever diazomethane is the aliphatic diazo compound synthesized, it distills over with the ether. In practice, it is desirable to replace the ether as it distills in order to avoid the hazards of such reaction mixtures involving limited amounts of solvent diluents.

The N,N'-dialkyl-N,N'-dinitrosooxamides used in the practice of this invention are those which have at least one hydrogen atom on each of the non-acyl carbons which are directly attached to both amido nitrogen atoms, i. e., the carbons alpha to the amido nitrogens, the remaining valencies of each of the said hydrogen-bearing alpha carbons being satisfied by hydrogen or by saturated aliphatic radicals of up to 18 carbon atoms. Examples are N,N'-diethyl-N,N'-dinitrosooxamide, N,N'-dibutyl-N,N'-dinitrosooxamide, N,N'-dihexyl-N,N'-dinitrosooxamide, N,N'-didodecyl-N,N'-dinitrosooxamide, N,N'-dioctadecyl-N,N'-dinitrosooxamide, and the like. The preferred nitrosooxamides are those having short chain alkyl substituents, i. e., those in which the alkyl groups have from 1 to 7 carbon atoms.

As previously indicated, the alkylmonoamines used in the ammonolysis of the N,N'-dialkyl-N,N'-dinitrosooxamides are those which have the amino nitrogen linked to a carbon carrying at least one hydrogen atom. Examples are methylamine, ethylamine, butylamine, 2-aminopropane, octylamine, dodecylamine, hexadecylamine, 4-aminoheptane, and the like. The preferred alkylmonoamines are those having short chain alkyl substituents of 1 to 7 carbon atoms.

Since, in the process of this invention, the N,N'-dialkyloxamide is formed along with the aliphatic diazo compound, it can be recirculated in the process and this provides substantial operating economies. The process can be performed on a practical basis as a cyclic operation.

As many apparently widely different embodiments of this invention may be made without departing from the spirit and scope thereof, it is to be understood that this invention is not limited to the specific embodiments thereof except as defined in the appended claims.

I claim:

1. In a process for preparing diazoalkanes, the improvement which comprises reacting an N,N'-dialkyl-N,N'-dinitrosooxamide in which the alkyl groups are identical and each contains 1 to 7 carbon atoms with hydrogen on alpha carbon with a primary alkyl monoamine in which the alkyl group is identical with the alkyl groups in said N,N'-dialkyl-N,N'-dinitrosooxamide, separating from the reaction mixture the resulting diazoalkane and an N,N'-dialkyloxamide in which the alkyl groups are identical with the alkyl groups in said N,N'-dialkyl-N,N'-dinitrosooxamide, nitrosating said N,N'-dialkyloxamide thereby forming the aforesaid N,N'-dialkyl-N,N'-dinitrosooxamide, and recycling the thus formed N,N'-dialkyl-N,N'-dinitrosooxamide for reaction with said primary alkyl monoamine as aforesaid.

2. In a process for preparing diazomethane, the improvement which comprises reacting N,N'-dimethyl-N,N'-dinitrosooxamide with methylamine, separating from the reaction mixture the resulting diazomethane and N,N'-dimethyloxamide, nitrosating said N,N'-dimethyloxamide thereby forming the aforesaid N,N'-dimethyl-N,N'-dinitrosooxamide, and recycling the thus formed N,N'-dimethyl-N,N'-dinitrosooxamide for reaction with said methylamine as aforesaid.

References Cited in the file of this patent

Backer, J. Chem. Soc. (London), vol. 101, pp. 592–595 (1912).

Werner, J. Chem. Soc. (London), vol. 115, pp. 1093–1102 (1919).

Arndt et al., Chem. Abstracts, vol. 24, p. 3985 (1930).

Arndt et al., Angew, Chem., vol. 46, pp. 47–48 (1933).

Eistert, Angew, Chem., vol. 54, pp. 99, 100, 129, 130 (1941).

Owen, Chem. Abstracts, vol. 38, p. 2006 (1944).